United States Patent [19]

Turnbull

[11] Patent Number: 4,683,054
[45] Date of Patent: Jul. 28, 1987

[54] APPLIANCE FOR PURIFYING WATER

[76] Inventor: William E. Turnbull, 1920 Canyon Dr., Coeur d'Alene, Id. 83814

[21] Appl. No.: 877,497

[22] Filed: Jun. 23, 1986

[51] Int. Cl.⁴ .............................................. C02F 9/00
[52] U.S. Cl. .................................... 210/91; 210/96.1; 210/138; 210/266; 210/282; 210/321.1
[58] Field of Search ................ 210/91, 96.1, 103, 138, 210/143, 266, 282, 284, 321.1

[56] References Cited

U.S. PATENT DOCUMENTS

| | | | |
|---|---|---|---|
| 3,159,573 | 12/1964 | Ritchie | 210/96.1 |
| 3,465,880 | 9/1969 | Lyall | 210/190 |
| 3,487,929 | 1/1970 | Sample et al. | 210/91 |
| 3,717,251 | 2/1973 | Hampton | 210/104 |
| 3,780,867 | 12/1973 | Zirlis | 210/282 |
| 3,802,563 | 4/1974 | Sasaki et al. | 210/120 |
| 3,950,253 | 4/1976 | Stern | 210/282 |
| 4,124,488 | 11/1978 | Wilson | 210/134 |
| 4,312,754 | 1/1982 | La Fontaine | 210/282 |
| 4,528,095 | 7/1985 | Byrne | 210/206 |
| 4,609,466 | 9/1986 | McCausland et al. | 210/321.1 |

Primary Examiner—Ivars Cintins
Attorney, Agent, or Firm—Keith S. Bergman

[57] ABSTRACT

A small portable appliance for purifying potable water. A vertical "C" shaped body supports a purified water container on its lower horizontal leg. The rearward portion of the body's vertical back releasably carries a filtration cartridge defining three separate intercommunicating chambers replaceably carrying a pre-filter cartridge, an osmotic filter cartridge and a carbon post-filter cartridge. Control circuitry shuts off water input when the purified water container is full, senses and annunciates the amount of dissolved solids in effluent water and measures use time to annunciate estimated time for filter cartridge change. Internal structure provides storage for a removable connector tube.

7 Claims, 14 Drawing Figures

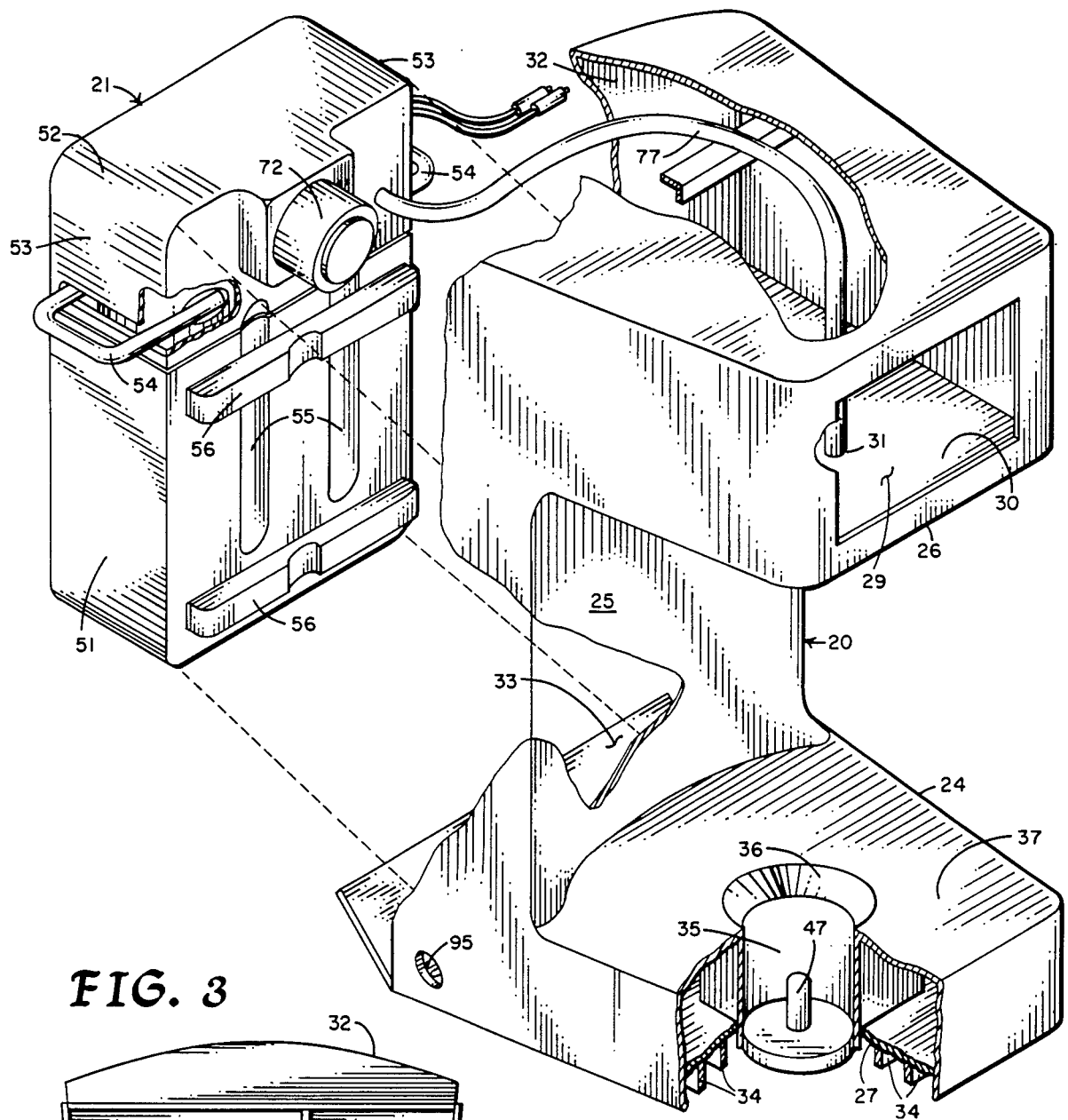
FIG. 1
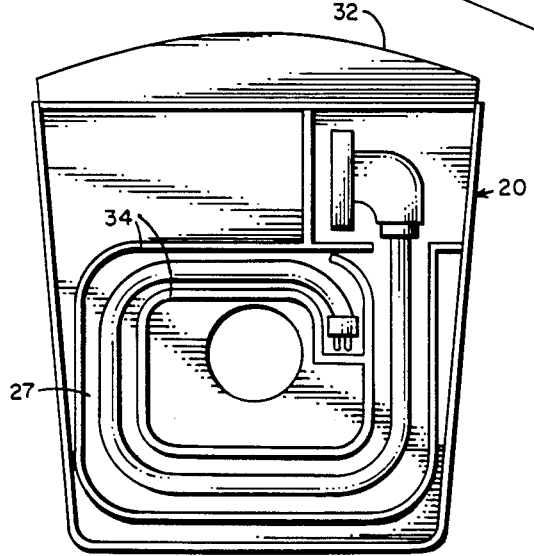
FIG. 3
FIG. 2

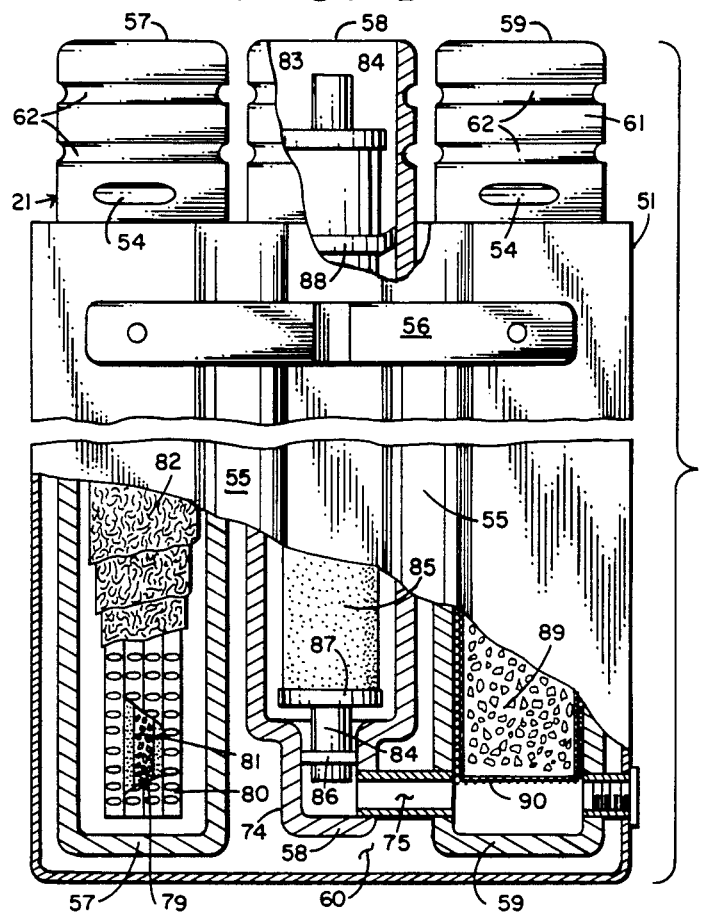
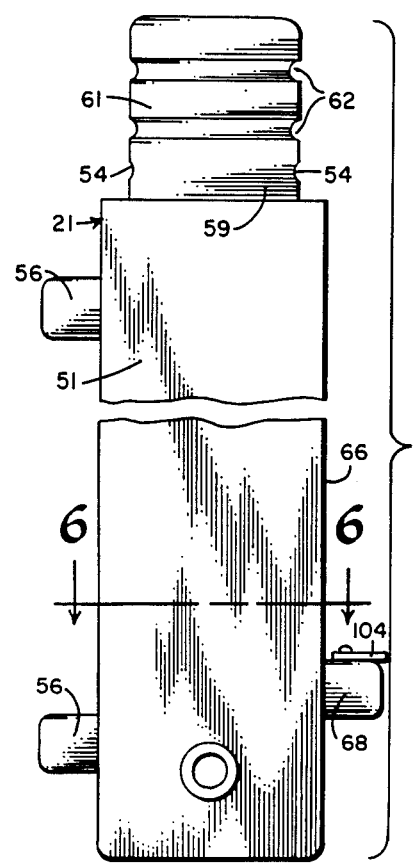
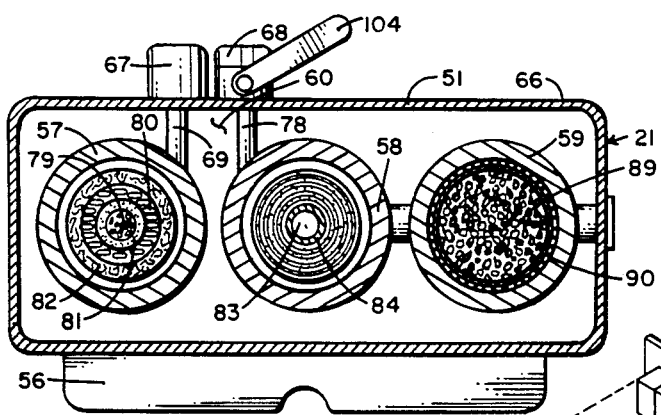
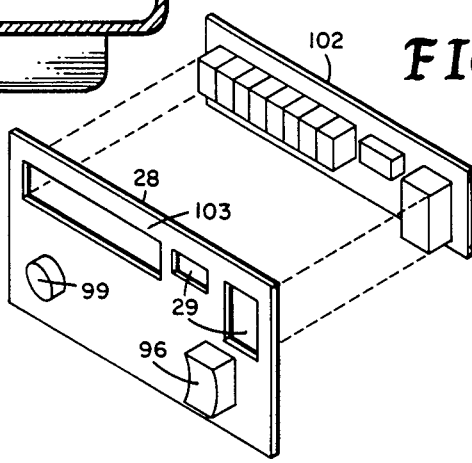

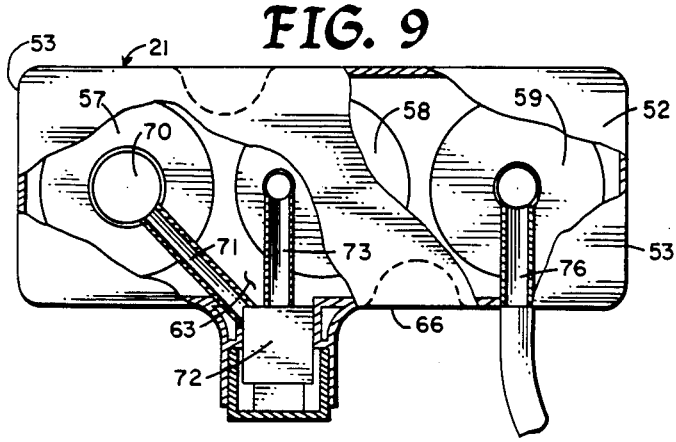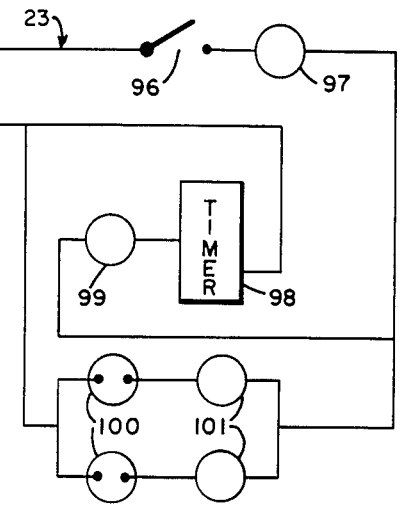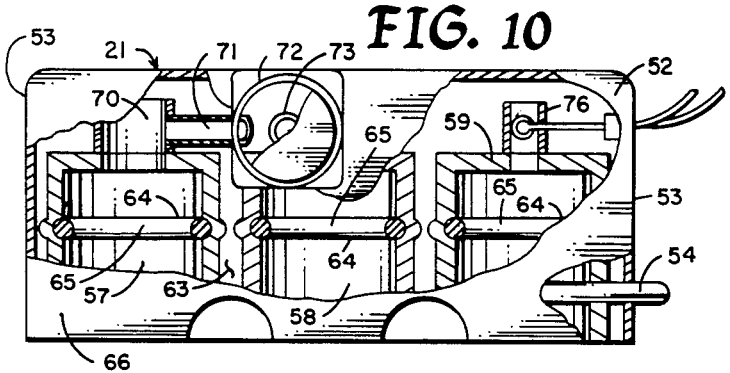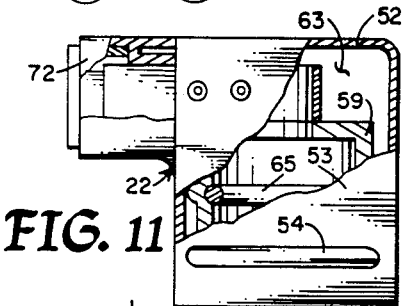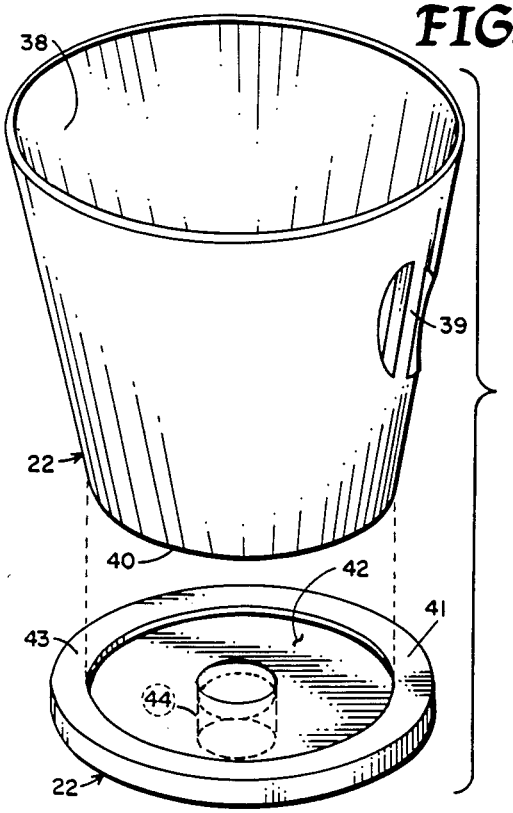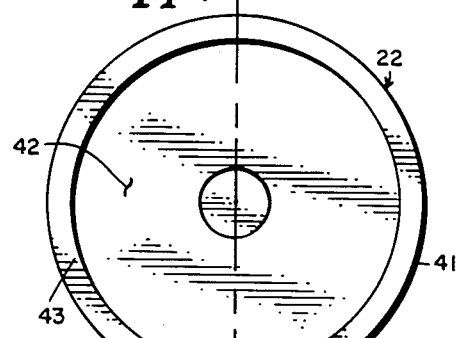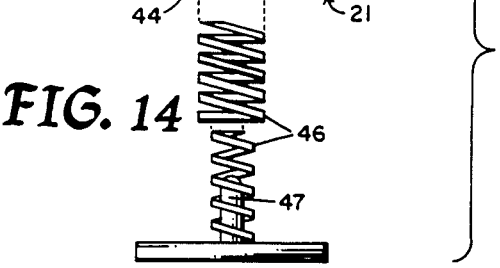

APPLIANCE FOR PURIFYING WATER

BACKGROUND OF INVENTION

1. RELATED APPLICATIONS

There are no applications related hereto heretofore filed in this or any foreign country.

2. FIELD OF INVENTION

My invention relates generally to potable water purifiers and more particularly to such a device that is of a small portable nature and provides replaceable cartridge-type purification elements.

3. DESCRIPTION OF PRIOR ART

Devices for purifying potable water containing physical debris, deleterious chemicals and micro-organisms have long been known. Most such devices have been relatively large, fairly complex systems adapted primarily for commercial use and operation by skilled personnel. Notwithstanding the progress in this field of art and the sophistication of municipal and domestic water supply systems of the present day, it has become increasingly popular to further purify potable water received in a household, particularly for drinking purposes. The instant invention adds a new and novel member to the class of device adapted to so do.

Water purifiers heretofore known for in domestic water purification have generally required service by trained technical personnel and because of the nature of their operation, have not provided an automated type of operation nor have they been of a nature to provide the user with a simple means to replace expendable elements. My invention is distinguished from this type of prior device because it is designed for household use by persons who are not experts or even knowledgeable in water purification. My invention provides various operative elements that are expended in use in cartridge-type containers. These containers are readily accessible by manual manipulation and the operative elements contained therein are in a modular cartridge form so that expended elements might readily be removed and replaced with the individual components or the complete system cartridge by an ordinary user without any technical expertise.

The principal filtering element of my invention comprises a semi-permeable membrane or osmotic film formed of polymeric material. This type of film has heretofore been used in the water purification arts. Some types of such films are sensitive to and rendered ineffective by the oxidative reaction of chlorine commonly contained in much potable domestic water. In the past this problem has not been too well considered and the chief reaction to it has been merely to more rapidly replace osmotic filter elements. My invention is distinguished from this prior procedure in that the pre-mechanical filter and pre-carbon filter are combined to eliminate the requirement for matching water supplies with or without chlorine with membrane types, commonly cellulose acetate for chlorinated supplies and composite membranes for non-chlorinated supplies. My invention is operative with any water supply that such devices may be applied to. The pre-filter element also removes gross debris and provides granular activated carbon to remove the bulk of any contained chlorine from water before presentment to the osmotic cell. This provides an osmotic cell that not only has a longer life, also but remains more efficient during its operation, as commonly if chlorine be presented to the polymeric film, that chlorine will not dissolve portions of the film or create holes in it to prevent, or lessen the effectiveness of, the osmotic process associated therewith.

I provide an osmotic membrane of cylindrical configuration comprising a spirally rolled sheet-like filter element. This filter configuration provides a maximum area of filtration membrane whereas the prior art using differing configurations provides a lesser area of membrane.

My invention provides a carbon filter as a final element to treat water after osmotic treatment to aid in removing various low molecular weight organic chemicals and other substances that may be carried in the water and cause undesirable tastes and odors, such as hydrogen sulfide.

Many prior art water purifiers have been adapted and designed for continuous operation which has been interruptable only by manual switching. The prior art devices that have provided a discontinuous operation generally have continued their purification operation unless manually stopped and have merely overflowed product to some waste source after the desired product has been produced. My invention is distinguished from these devices in that I provide electric valving means for the pressurized water input to shut off that input responsive to filling of a purified water container. This is possible with my purifier because of the particular filtering reactions described but, oftentimes with prior art devices, it was not practically feasible because of damage that could be caused to the various elements and components during shut-down periods.

My invention also provides electronic circuitry to automatically indicate and annunciate condition of the purifier and its need for replacement of active elements. Prior water purifiers have generally relied upon the expertise of operators to make this determination and have not provided automatic facilities for so doing. I provide an electronic timing circuitry that determines the total elapsed time of operation of my device and annunciates a particular elapsed period. In addition, I provide electronic sensing of the content of impurities in the input and the output water so that the two parameters may be annunciated and the efficiency of operation of the device determined by comparing their difference in parameters or the absolute value of the later parameter. When this efficiency falls below a predetermined level, the filtration elements may be changed to renew their activity.

My invention does not reside in any one of these structures or functions per se, but rather in the synergistic combination of all of them to provide a new and novel water purifier that is distinguished from the prior art, either individually or in any combination of its elements.

SUMMARY OF INVENTION

My invention generally provides a "C" shaped body supporting a purified water container on its lower arm and releasably carrying a purification cartridge in the rearward part of its upright portion.

The purification cartridge defines three cylinder-like cells, the first carrying a mechanical and particulated carbon filter, the second carrying a spirally wound osmotic filter and the third carrying an particulated carbon filter. Each filter element is removably carried for replacement. Appropriate conduits pass input water sequentially through the purification cartridge filters and thence to the upper arm of the body for deposition into the purified container therebelow. The osmotic filter provides a multi-layered spirally wound polymeric sheet material of a polyamide type that is resistant to chlorine and bacterial attack.

The purified water container has associated movable support structure carried in the lower arm of the body to mechanically bias the support to an upper position but sense its movement to a lower position responsive to the purified water container weight. Associated electrical circuitry operates a solenoid valve in the water input circuit to open that valve only when the container is in place and not full.

Ancillary sensing and annunciating circuitry measures elapsed time of operation of my device and annunciates a predetermined period of operation to indicate potential need for filtration element replacement. Sensing circuitry senses total electrical conductivity in the input, output, or both and annunciates these values to allow determination of operational efficiency of the device.

In creating such a device, it is:

A principal object of my invention to create a water purifying appliance that is small, portable, self-contained, and adapted for use by inexperienced and untrained operators.

A further object of my invention to create such a water purifier that senses the presence of a container and the amount of purified water therein to allow water input to the system only when a container is in place and not full.

A further object of my invention to provide such a water purifier that has three separate sequential purifying stages, the first embodying mechanical filtration and chlorine removal by particulated carbon, the second providing osmotic purification and the third providing further carbon purification, particularly of contained chemical substances, to provide such a device that is of long life and high reliability.

A further object of my invention to provide such a water purifier that has separate cartridge-type filter elements that are removably contained by the appliance and may be individually or jointly replaced.

A further object of my invention to provide such a water purifier that uses an osmotic membrane formed of polyamide material to resist deleterious actions of chlorine and microbes and is configured as a cylindrical spiral to provide more efficient operation than other types and configurations of osmotic membranes.

A still further object of my invention to provide such a purifier that has control circuitry to measure and annunciate processed water quality and elapsed time of operation, particularly to indicate need for replacement of expendable filtration elements.

A still further object to provide such a water purifier that has internal storage facility for unsightly conduit.

A still further object of my invention to provide such a water purifier that is of new and novel design, of rugged and durable nature, of simple and economic manufacture and maintenance and one otherwise well suited to uses and purposes for which it is intended.

Other and further objects of my invention will appear from the following specification and accompanying drawings which form a part hereof. In carrying out the objects of my invention, however, it is to be understood that its essential features are susceptible of change in detail and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an expanded isometric surface view of the body of my purifier, partially cut away, to show the details of various of its elements.

FIG. 2 is an isometric view of the power supply unit of my invention.

FIG. 3 is an orthographic bottom view, looking upwardly, at the bottom of my purifier, showing particularly the space for conduit containment.

FIG. 4 is an orthographic side view of the purification cartridge, partially cut away and with the top removed to show various elements of its structure.

FIG. 5 is an orthographic end view of the structure of FIG. 4 showing various elements from this aspect.

FIG. 6 is a horizontal cross-sectional view of the structure of FIG. 4, taken on the line 6—6 thereon in the direction indicated by the arrows, to show the various purification cartridge elements and structures from this aspect.

FIG. 7 is an electrical circuit diagram of my invention, shown in normal symbology.

FIG. 8 is an isometric view of the electrical control panel structure of my invention.

FIG. 9 is an orthographic top view of the top of the purification cartridge, partially cut away, to show particularly various water conduits therein.

FIG. 10 is an orthographic side view of the purification cartridge top of FIG. 9, partially cut away to show various internal details.

FIG. 11 is an orthographic end view of the purification cartridge top of FIGS. 9 and 10, partially cut away to show internal details.

FIG. 12 is an expanded isometric view of the purified water container and of its supporting base.

FIG. 13 is an orthographic top or plan view of the container support structure.

FIG. 14 is a vertical cross-sectional view of the structure, taken as on a line 14—14 on FIG. 13 in the direction indicated by the arrows, showing that structure in place in the upper portion of the lower body arm.

DESCRIPTION OF THE PREFERRED EMBODIMENT

My invention generally provides body 20 releasably carrying purification cartridge 21 in the rearward part of its upright portion and water container and support structure 22 on its lower arm. Associated electrical circuitry 23 controls water input and senses operational parameters.

Body 20 is of a general "C" shape having structurally intercommunicating horizontal lower base arm 24, perpendicular vertically extending back 25, and horizontal upper arm 26 extending over lower arm 24 at a spaced distance thereabove. This structure is peripherally defined with appropriate internal supports by rigid material such as a polymeric plastic.

The bottom of base arm 24 provides a surface upon which the body may be supported by a planar supporting surface such as a countertop. Forward panel 28 of the upper arm provides electric panel orifice 29 through which portions of the electrical control circuitry may project and be accessed for viewing and operation. Lower surface 30 of the upper arm provides output conduit orifice 31 in its medial portion to allow passage of an output orifice to disburse purified water into a container therebelow.

Rearward surface 32 of upright back 25 of the body defines rectilinear cartridge cavity 33 to releasably receive and contain purification cartridge 21. This chamber is peripherally configured and dimensioned to receive the purification cartridge and may embody ordinary catch structures, as desired and known in the prior plastic arts, to aid in releasably maintaining the cartridge against accidental displacement.

Lower surface 27 of the base arm provides elongate curvilinear septa 34 to define a channel for releasable positioning of conduits therein. These septa are so arranged as not to interfere with cylindrical container support well 35 defined in the medial portion of the lower base arm. This container support well is a cuplike structure as illustrated, with flared upper open portion 36 communicating with upper surface 37 of the lower arm.

Preferably the entire base structure is formed of some rigid material such as a plastic polymere. Such material may conveniently be configured by molding and the entire body formed as a unitary structure, though obviously it well may be created from other material and by other known methods to yet serve the purposes of my invention so long as it have appropriate rigidity, strength and configuration so to do.

Water container and support 22 are illustrated particularly in FIGS. 12, et seq. Water container 38 comprises a peripherally defined truncated conic having its smaller base lowermost and providing medial handle 39 to aid its manual manipulation. The configuration and dimensioning of the container are such as to allow it to fit on the medial part of the lower base arm and within the space defined between upper and lower arms 24, 26 of the body structure.

Circular bottom 40 of the water container is carried by container support disk 41 defining circular indentation 42 in its upper surface to receive the bottom of the water container with rim 43 extending thereabout to aid in positionally maintaining the container. Support disk 41 carries medial depending support cylinder 44 configured to fit for limited vertical motion within the chamber defined therefore by container support well 35 defined in the lower base arm. The support cylinder defines vertically medial sensory groove 45 and is biased to an upward position by interfitting compression springs 46 carried within its hollow interior about spring peg 47 supported by the upper surface of bottom 27 of the lower base arm. Position sensory switch 48 is carried laterally of support well 35 of the body and has sensing arm 49 extending through hole 50 defined in the support well 35 to allow the sensing arm to be carried for vertical motion within sensory groove 45 of support cylinder 44 of the container support disk. This structure allows the position sensitive switch to have a medial null position, an upward position when no water container is carried on the support disk and a lower position when the container on the support disk is full, each of which positions are used as hereinafter specified to control functions of my water purifier. In the structure specified, compression springs 46 must maintain support disk 41 at a spaced distance above the upper surface of lower arm 24 of the body to allow proper functioning of the position sensitive switch 48, but must also allow placement of a water container on the support disk.

Purification cartridge 21 is particularly illustrated in FIGS. 5 through 11. It provides rectilinear peripherally defined body 51 and cross-sectionally similarly shape cap 52 releasably joinable to the body to form the entire cartridge structure. The purification cartridge is peripherally dimensioned and configured so as to fit within the chamber defined therefore in the rearward surface of upright back 25 of the body. The cap element carries at each end 53 "U" shaped clip elements 54 which may be moved inwardly and outwardly relative to the cap to be releasably carried in their inward position in grooves 55 defined in the upper cylindrical elements of the cartridge base structure to releasably fasten the two elements together. This particular fastening structure also prevents the purification cartridge from being inserted in operative position in chamber 33 defined in the body when the cap be not fastened, as the outwardly extended fastening elements 53 will prevent the cartridge from being placed within that chamber.

The exterior surface of the purification cartridge may be provided with various grooves 55 and protuberances 56 to aid its alignment, releasable positioning and fastening within the cavity defined in the body structure.

Base 51 of the purification cartridge defines three cylinders 57, 58 and 59 structurally carried within body cavity 60. All cylinders have similar upper portions 61 extending a spaced distance above base 51 to interfit within the cap structure. Upper portions 61 of each cylinder define vertically spaced grooves 62 to receive resiliently deformable "O" rings to sealably interfit with grooves defined in the cap element. Cap 52 defines three cylindrical chambers positionally arrayed to receive the upper portions 61 of the cylinders carried in the body of the cartridge structure. These chambers define "O" ring grooves 64 to sealably receive "O" ring 65 carried by cylinders.

Back 66 of cartridge body 51 structurally carries input fixture 67 and saline output fixture 68 both comprising quick disconnect type fixtures to releasably interconnect to supply and exhaust conduits respectively. Input fixture 67 communicates by channel 69 to the outer portion of first purification cylinder 57. Channel 78 communicates from the outer portion of medial osmosis cylinder 58 to saline output fixture 68 from which fluid is exhausted (by conduit not shown.) The output fixture may carry normally closed, manually operable saline valve 104 to allow complete opening for saline flushing when necessary. Both input and saline lines are slidably carried in the cartridge body for linear motion so that they may be removed from and inserted into cartridges to be serviced to allow removal and replacement of the cartridges.

Cap structure 52 defines a diametrically smaller medial chamber 70 above the middle portion of cylinder 57 to receive output from the medial portion of a filter carried therein. This chamber 70 communicates by conduit 71 to solenoid valve 72 which in turn passes fluid from channel 71 through communicating channel 73, when in open condition. Channel 73 communicates to the outer portion of second cylinder 58. Lowermost portion 74 of cylinder 58 is diametrically smaller than the cylinder proper to receive the medial channel portion of a filter cartridge. This portion 74 communicates by duct 75 with the lower portion of third filter cylinder 59. The upper portion of cylinder 59 communicates by channel 75 to output conduit 76 to pass fluid to the orifice of this conduit located in the medial portion of lower surface of upper arm 26, from whence it passes by gravity into purified water container 38. This water passage circuitry is defined within the top and body portions of the purification cartridge by appropriate conduit as illustrated.

First purification cylinder 57 provides a cartridge type filtration element comprising medial channel 79 peripherally defined by rigid, water permeable member 80 and carrying particulated carbon 81. Fiber filter 82 is spirally wound about the periphery of rigid membrane 80. Water is input into this filter cartridge about its periphery and passes through the filter and into internal chamber 79 from whence it passes into channel 71 and thence through valve 72 and channel 73 into second purification cylinder 58. This first filter cartridge is formed as a unit and may be removed and replaced in the first cylinder 57 as such.

Second cylinder 58 receives water output from the first cylinder about its peripheral area. It provides a cylindrical osmotic filter having medial channel 83 defined by rigid, water permeable cylindrical core 84 which carries sheet-like flexible osmotic membrane 85 spirally wound about its periphery. Input water passes inwardly through the osmotic filter and into medial channel 83 defined by the core element. The lower portion of the medial channel extends downwardly into lower chamber 74 wherein it is sealed by resiliently deformable "O" ring 86 extending between the outer periphery of the cylinder core and the interior surface of chamber 74. The purified output from this osmotic filter passes through channel 75 and into the lower portion of third purification cylinder 59. Excessive saline solution exterior of the peripheral surface of osmotic filter 85 is removed through conduit 78 and saline output fixture 68 to thereafter be wasted.

Osmotic filter 85 is of a sheet-like configuration and and formed by winding in a spiral fashion about water pervious cylindrical core 84 to provide a multi-layered structure through which water must pass to gain entry to internal chamber 83 defined by the core to aid the efficiency of the structure. The material from which the osmotic filter is formed is a type of polyamide polymer designed for such purposes and commercially available in the present day water purification arts. This material allows the osmotic process to be carried on across its surface but yet is relatively impervious to both the action of microbes, their waste products, and chlorine in concentrations commonly contained in the water being purified. This type of material is not new but known in the existing water purification arts and therefore not specified in detail.

The lowermost portion of osmotic filter 85 is sealed by bottom cap 87 to prevent access of water upwardly between lower edges of adjacent layers of the osmotic membrane, and the upper periphery of the membrane is similarly sealed by annular seal 88 extending from the outer surface of the filter to the interior surface of cylinder 58 which carries the filtering membrane.

Third filter cylinder 59 carries finely particulated carbon 89 contained in a peripheral water pervious covering 90 for ease of handling. This charcoal filter substantially fills the third cylinder 59. Water is input into the cylinder from its lower portion through conduit 75 and the purified output is removed from the upper portion through conduit 76.

The electrical control circuitry of my invention is shown in gross in FIGS. 2 and 8 and symbolically in FIG. 7. The electrical circuitry involved is well known in the water purification arts and is therefore not shown in any particular detail.

As seen in FIG. 3, electrical energy is input through ordinary two prong grounded plug 91 and transformed into 12 volt direct current by transformer 92 from which it passes through line 93 to jack plug 94 which releasably attaches to my appliance by jack 95 carried in the lower portion of one side of the body.

This input current passes in series through position sensitive switch 48 which passes that current when it is in its medial operative position but which does not pass it in either its extreme upward or downward position, that is, when there is no container on support disk 41 or when the container carried thereon is filled with water. The current passed through switch 48 operates solenoid valve 72 to open that valve when the switch be in medial position but close it when it be in either extreme position, so that water flows into the appliance only when the water container is positioned on support disk 41 and is not full, but not otherwise.

The electrical input circuitry provides single pole, single throw on-off switch 96 with associated series connected indicator light 97 which visually annunciates the 'on' condition of the apparatus. Electronic timer 98 is connected in series with on-off switch 96 to measure the real elapsed time during which the switch passes current to the apparatus. When that time reaches a certain predetermined amount, the timer operates as a switch to activate indicator light 99 to annunciate this condition and a potential requirement for change of the filtering elements of my appliance.

The purity sensing circuitry of my invention provides a sensor element having cooperating, spaced, paired electrode sensor elements 10 that measure resistivity of current passing between electrode elements and in the fluid therebetween. This resistivity is translated into numeric values representing contained electrolized solids by known methods and standards and displayed by LED displays 101 associated with each sensor. One sensor is positioned in the output line after all purification has occurred so that the total amount of solids removed may be determined to indicate the efficiency and nature of the operation of my filter. Two sensors may be used as illustrated, and if so one is positioned in the input line and one in the output line, so that filtration efficiency might be measured by comparing the difference in the readings. Such sensors and annunciators are known and have heretofore been used in the water purification arts for similar purposes.

The entire electrical panel and associated switches are carried on electronic board 102 positioned behind face plate 103 which is carried by front panel 28 of upper body arm 26 for ease of access and convenience.

Having described the structure of my invention, its function and operation may be understood.

Firstly, a water purifier is formed according to the foregoing specification. It is positioned in the vicinity of supply sources for water and electricity and interconnected to an ordinary pressurized household water source through input fixture 67 and to a source of ordinary household current, normally 60 cycle, 120 volt alternating current by plug 91. Saline fixture 68 is provided with an appropriate means, normally a tubular element (not shown), so that saline water presented through such channel may be wasted to some area where it will cause no harm.

Input water enters my purifier through input fixture 67 and thence passes into the peripheral portion of first purification cylinder 57. This input water is supplied from an ordinary domestic water system and will be presented to the water purifier under some pressure, generally about 60–80 pounds per square inch. If necessary either water pressure or flow volume may be adjusted for use with my purifier by ordinary known means. It should be remembered that this water from ordinary domestic water systems normally has previously been purified to some degree, commonly by removing various mechanically filterable substances and by chemical means such as the use of chlorine and its salts to kill living microorganisms. This input water passes to and through fiber filter 82 and thence through carbon 81 inside permeable element 80 and moves upwardly through internal chamber 79 to exit from the first cylinder through channel 73.

If solenoid valve 72 is open, as it will be at the initiation of operation of the device since the pitcher will be in place on its support and will not be full, the input water passes through the solenoid valve and through channel 73 to second purification cylinder 58. This water is introduced about the periphery of the second cylinder and it passes thence radially inwardly through osmotic filter element 85, into medial channel 83, and thence downwardly to lower chamber 74 of the second cylinder. Water exits from the lower portion of second cylinder 58 to channel 75 and therethrough to the lower portion of third cylinder 59. Once in the lower portion of cylinder 59, water passes upwardly through covering 90 and contained particulate carbon 89 to the top portion of the cylinder from whence it is removed through the water output channel to be ultimately deposited in water container 38.

As the process continues and water container 38 fills to a predetermined weight of water, that container will compress spring 46 biasing support disk 41 to a medial position. As this occurs, position sensitive switch 48 will be activated to operate solenoid valve 72 to close that valve. This will stop the pressurized flow of water through the system and allow passage of the pressurized water only up to the valve.

If a filled container be removed from my appliance, support disk 41 carrying it will move to its uppermost position by reason of the bias of spring 46 and this positioning again will prevent passage of current to solenoid valve 72 and cause that valve to remain closed. If the water container is emptied and replaced on support disk 41, the support disk will assume its normally medial position and in this position, switch 48 will operate to allow valve 72 to open and allow pressurized water to pass through the system to operate it.

When position sensitive switch 48 is in a medial position, to open solenoid valve 72, it also passes current to timer 98 and this electronic device acts as a time accumulation clock to determine the total elapsed time of operation of my device. When this total elapsed operation time reaches a certain predetermined amount, timer 98 operates as a switch to pass current to indicating light 99, in series therewith, to annunciate the time passage. This annunication continues until the timer is reset to indicate to a user the amount of use the filtering components of the device have had and the indicate potentiality of necessity to change those units by reason of use.

Sensor elements 100 determine the resistivity between their sensor electrodes in the water in my purifier. This current may be translated by known methods heretofore used in the water purification arts to a value of total parts per million of dissolved solids and this information is displayed by LED display 101. When the value of total dissolved solids falls below certain predetermined limits, this indicates potential need for change of the filtering elements.

Off-on switch 96 is interposed in series with the electric current source to turn the appliance off completely, if desired. Indicator light 99 is carried in series with switch 96 to visually annunciate the switch condition and thusly the operative condition of the appliance.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A portable self-contained purifying appliance for potable water comprising, in combination:
   a body having an elongate horizontal lower arm for support on a supporting surface with a vertical portion extending upwardly from one end thereof to support an upper arm extending perpendicularly to the upright and over the lower arm at a spaced distance thereabove, said body having
   means in the lower arm to carry a container support,
   a chamber defined in the upright portion to releasably receive a purification cartridge, and
   water input means to input water to a purification cartridge, including solenoid valve means to regulate the flow of input water;
   a container support carrying a water container, said support having a medial depending support cylinder slidably carried for vertical motion within a channel defined in the lower arm, said container support being biased to an upper position and having a three position sensitive switch to sense the conditions of no container being supported, an unfilled container being supported, and a filled container being supported;
   a purification cartridge releasably carried within the purification cartridge chamber defined in the body upright, said purification cartridge defining three adjacent, sequentially intercommunicating chambers, the said first chamber carrying a mechanical filter and a particulated carbon filter, the second chamber carrying an osmotic filter and the third chamber carrying a particulated carbon filter, and having means to pass water from the third cylinder to the container carried by the body structure; and means of removing saline water from the unfiltered side of the osmotic filter carried in said second chamber; and
   associated electrical control circuitry to open the solenoid valve of the water input means only when a water container be in supported position on the container support and be not full, timing circuitry to determine the lapse of time of operation of the solenoid valve of the water input means and annunciate passage of a predetermined time, and circuitry to sense and annunciate the electric resistivity of water in the appliance to determine operational efficiency of the device.

2. The invention of claim 1 wherein the osmotic filter comprises a cylindrical element having a medial water permeable core spirally wrapped with sheet-like polyamide osmotic filter material, water being input about the periphery of the filter and being passed therethrough to the central core for collection and further disposition.

3. The invention of claim 1 further characterized by each filtration element being formed as a removable cylindrical cartridge that may be replaced in the water purification unit.

4. A small portable water purifying appliance comprising in combination:
- a rigid "C" shaped body having an upright back with perpendicularly extending horizontally disposed lower arm at its base and upper arm at its top, said upper arm extending over the lower arm at a spaced distance thereabove;
- a container support having a container disk with a support cylinder depending therefrom, said support cylinder being supported for limited vertical motion in a channel defined in the medial portion of the lower arm, said container support being mechanically biased to an upward position, and having an associated position sensitive switch to change state only when a container is carried on the support and is not full;
- a purification cartridge releasably carried in a chamber defined in the upright body, said purification cartridge defining three intercommunicating cylindrical filtration chambers with water input means communicating to the first filtration chamber, a charcoal and mechanical filter carried in the first filtration chamber, means to pass effluent water to the second filtration chamber, an osmotic membrane filter carried in the second filtration chamber, means to pass effluent to the third filtration chamber, an activated charcoal filter carried in the third filtration chamber and means to pass effluent from the third filtration chamber to the water container; and
- means of supplying water to the first filtration chamber, and of allowing water to flow from the first cylinder only when a water container is positioned on the container support and not filled with a predetermined weight of water.

5. The invention of claim 4 further having associated electrical circuitry providing:
- switch means of regulating input of current from an external source;
- valve means of regulating water supply from the second filtration cylinder responsive to the state of the position sensitive switch carried by the container support;
- timing means to determine and annunciate the passage of a predetermined period of time of operation of the appliance; and
- sensing means to sense and annunciate electrical resistance in at least the output channel to determine efficiency of operation.

6. The invention of claim 4 further characterized by:
- the bottom of the lower arm defining a channel to releasably carry a connecting conduit to interconnect the water purifier with a source of water to be purified and waste saline water therefrom.

7. In a portable domestic appliance for purification of portable water, a releasably carried purification cartridge having replaceable filtration elements comprising, in combination:
- a peripherally defined body having a base portion and a releasably joined, peripherally defined top portion cooperating to define a chamber;
- three chambers cooperatively defined in the base portion and the top portion of the body, said chambers having upper parts defined in the top portion, said chambers being sequentially interconnected and each chamber carrying a releasably positionable, replaceable filter,
  - the first chamber carrying a filtration cartridge having a particulated carbon core with a mechanical filter extending about the periphery thereof,
  - the second chamber carrying a filtration cartridge having an elongate cylindrical channel defined by a water permeable cylinder with a plurality of layers of polymeric osmotic membrane thereabout, and
  - the third chamber carrying a filtration cartridge having particulated carbon enclosed in a water permeable container; and
- means of supplying water to the first chamber, of removing saline solution from the second chamber, and of removing filtered water from the third chamber.

* * * * *